United States Patent Office 2,870,059
Patented Jan. 20, 1959

2,870,059

PROCESS OF MOLDING DITHIOCARBAMATE SLURRIES WHICH CONTAIN GUAR GUM

Mortimer P. Williams, Houston, and Carroll T. Kirchner, Pasadena, Tex., assignors to E. I. du Pont de Nemours and Company, Wilmington, Del., a corporation of Delaware No Drawing. Application August 15, 1956
Serial No. 604,088

3 Claims. (Cl. 167—42)

This invention relates to the forming of shapes of dithiocarbamates by adding guar gum to a slurry of the dithiocarbamate and thereafter forming the product into appropriate shapes for further processing or use.

Dithiocarbamates, and particularly zinc ethylene bis (dithiocarbamate), form thixotropic slurries in water. The slurries are for the most part not truly thixotropic in that structure is rebuilt very slowly after the slurries are disturbed. But like true thixotropic slurries these products have the property of becoming quite fluid when disturbed. It is therefore extremely difficult to extrude them or in other manners to form them into shapes which can be dried.

According to the present invention an aqueous slurry of a dithiocarbamate is treated with guar gum. Preferably zinc ethylene bis(dithiocarbamate) mixed with an inert such as fuller's earth is treated with guar gum. The addition of guar gum to such slurries affects their physical nature so that they are no longer thixotropic and they can readily be extruded or in any other suitable manner formed into pellets, particles, or other shapes.

The dithiocarbamates which can be treated according to the invention are any of those commonly employed in agriculture as fungicides or in the rubber industry as accelerators and treating agents for rubber. Thus there can be used ferric dimethyldithiocarbamate, zinc dimethyldithiocarbamate, manganese ethylene bisdithiocarbamate, and other water insoluble dithiocarbamates which can be slurried and made into formed bodies. Such products are shown in United States patents Tisdale and Williams 1,972,961, Hester Re. 23,742, and Flenner 2,504,404. Most preferred however is the zinc ethylene bisdithiocarbamate.

The dithiocarbamate to be treated according to the invention is formed in the course of its manufacture in water and ends up as an aqueous suspension or slurry. This contains more or less water and often contains salts resulting from the process of manufacture.

To this slurry or suspension there can be added an inert material which is to be present as a carrier or diluent in the final product. Thus there can be used fuller's earth, diatomaceous earth, and other such finely divided materials. Typical inert carriers are described in the Tisdale and Williams and the Flenner patents described above. The inert material can be used in amounts already common in the art. With zinc ethylene bis(dithiocarbamate) the fuller's earth is preferably used in an amount of about 25 to 30 percent by weight based on the amount of zinc ethylene bis(dithiocarbamate).

Simultaneously with the addition of the fuller's earth or other inert carrier if one is used, there can also be added a sufficient amount of guar gum to radically change the character of the dispersion or slurry.

Guar gum is the refined endosperm of the guar seed which is separated from the hull and the germ of the seed. Guar is known by the botanical name of Cyamopsis Tetragonolba. It is a free flowing, white powder. It is water soluble and it swells in, disperses in, and absorbs water. Chemically it is a polysaccharide and consists principally of a complex carbohydrate polymer of galactose and mannose. It is often termed a galactomannan.

The amount of guar gum can be considerably varied. With the zinc ethylene bis(dithiocarbamate)-fuller's earth mixture as above described, it will ordinarily be desired to use about 1 percent of guar gum based upon the total solids in the slurry. More broadly, from about 0.5 to 5 percent of guar gum should be used with the specific system mentioned and amounts within this range will ordinarily be used with other dithiocarbamates. So much should not be used as to cause the product to gel prematurely and become difficult to filter or handle further and of course enough must be used to affect the structure of the particles which are to be formed. The exact amount to use with a particular dithiocarbamate and with particular inerts can readily be determined with a few simple experiments.

The slurry formed as above described normally contains a considerable excess of water. It should accordingly be filtered in accordance with present commercial practices to remove the excess water. It is often desirable to wash the product at this point to remove soluble salts which remain as a result of the process of manufacture.

With a zinc ethylene bis(dithiocarbamate)-fuller's earth mixture as above described, the amount of solids will be about 32 to 42 percent in the filter cake with about 58 to 68 percent water. This can very within considerable limits. If more water is present, it will ordinarily be desired to use a little more of the guar gum and contrariwise, if there is less water, then somewhat less guar gum will be required. With other dithiocarbamates, the water content will preferably fall within the same limits though more or less water can be present depending upon the specific system used. The consistency should be that of a firm paste which can readily be formed into particles or desired shapes by the method selected.

A slurry prepared as above described can then be shaped in any suitable way. Ordinarily it will be easiest to extrude the slurry through a plate having holes of the desired diameter. If the amount of guar gum and the amount of water have been selected correctly, the extruded shapes will be coherent but will not have any great tendency to stick together. Instead of the particles being extruded, they can of course be shaped in any desired way, as by molding.

The shapes, according to customary practices, are dried and are usually thereafter ground to a fine powder. In order that the invention may be better understood reference should be had to the following illustrative example.

*Example*

A slurry was formed having a total volume of 4500 gallons and containing zinc ethylene bis(dithiocarbamate) and the sodium chloride resulting from its production. There was about 5 percent of sodium chloride based on the water present and 2100 pounds of zinc ethylene bis (dithiocarbamate).

To this slurry there was added 600 pounds of fuller's earth in 350 additional gallons of water together with 33 pounds of guar gum.

The resulting mixture was filtered and washed with water to remove soluble matter. The wet cake contained 35 percent solids.

This was extruded through a die plate having ¼ inch holes. The shapes extruded remained separate without serious agglomeration. The shapes were then dried and thereafter ground to a fine powder.

I claim:

1. In a process for forming shapes of a dithiocarbamate, the steps comprising adding 0.25 to 5 percent by weight based on the weight of dithiocarbamate of guar gum to an aqueous slurry of the dithiocarbamate, removing excess water, and forming the mixture into shapes.

2. In a process for forming shapes of a dithiocarbamate, the steps comprising adding 0.5 to 1 percent by weight based on the weight of dithiocarbamate of guar gum to an aqueous slurry of the dithiocarbamate, removing excess water, and extruding the mixture to form shaped bodies of the product.

3. In a process for extruding zinc ethylene bis(dithiocarbamate), the steps comprising forming a slurry of zinc ethylene bis(dithiocarbamate) containing 25 to 30 percent by weight of fuller's earth, based upon zinc ethylene bisdithiocarbamate, and forming an aqueous slurry of the mixture, adding guar gum in the amount of about 1 percent by weight based upon the solids content of the slurry, filtering to remove excess water to a solids content of 32 to 42 percent, extruding the slurry to form shapes, and drying the shapes.

References Cited in the file of this patent

UNITED STATES PATENTS

| | | |
|---|---|---|
| 2,508,726 | Ramstad et al. | May 23, 1950 |
| 2,517,799 | McWhorter et al. | Aug. 8, 1950 |
| 2,545,948 | Flenner | Mar. 20, 1951 |
| 2,662,882 | Christianson et al. | Dec. 15, 1953 |

FOREIGN PATENTS

| | | |
|---|---|---|
| 561,762 | Great Britain | June 2, 1944 |

OTHER REFERENCES

"Food," January 1949 (pp. 4, 5, 6 relied on).
"Food," March 1949 (pp. 86–89 relied on).